(12) United States Patent
Valovick (10) Patent No.: US 10,174,804 B2
(45) Date of Patent: Jan. 8, 2019

(54) TORSIONAL VIBRATION ABSORBER FOR A VEHICLE

(71) Applicant: GM GLOBAL TECHNOLOGY OPERATIONS LLC, Detroit, MI (US)

(72) Inventor: Brian M. Valovick, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 92 days.

(21) Appl. No.: 15/360,022

(22) Filed: Nov. 23, 2016

(65) Prior Publication Data

US 2017/0167567 A1    Jun. 15, 2017

Related U.S. Application Data

(60) Provisional application No. 62/265,574, filed on Dec. 10, 2015.

(51) Int. Cl.
| | |
|---|---|
| *F16C 3/02* | (2006.01) |
| *F16F 15/12* | (2006.01) |
| *B60K 17/16* | (2006.01) |
| *F16F 15/22* | (2006.01) |
| *B60K 17/24* | (2006.01) |
| *B60K 17/22* | (2006.01) |

(52) U.S. Cl.
CPC .......... *F16F 15/1202* (2013.01); *B60K 17/16* (2013.01); *F16C 3/02* (2013.01); *F16F 15/1206* (2013.01); *F16F 15/1208* (2013.01); *F16F 15/22* (2013.01); *B60K 17/22* (2013.01); *B60K 17/24* (2013.01); *F16F 2222/08* (2013.01); *F16F 2236/08* (2013.01); *Y10T 74/2131* (2015.01); *Y10T 464/50* (2015.01)

(58) Field of Classification Search
CPC .............. F16F 15/1202; F16F 15/1206; F16F 15/1208; F16F 15/22; F16F 2222/08; F16F 2236/08; B60K 17/24; B60K 17/16; F16C 3/02; Y10T 464/50; Y10T 74/2131
USPC .................. 464/127, 180; 74/573.12, 574.4; 188/379, 380; 180/381
See application file for complete search history.

(56) References Cited

U.S. PATENT DOCUMENTS

| | | | |
|---|---|---|---|
| 729,649 A * | 6/1903 | Nyberg | .................... 74/574.4 X |
| 2,159,235 A * | 5/1939 | Tyler | ......................... F16D 3/68 |
| | | | 74/574.4 |
| 3,037,573 A | 6/1962 | Larsen | |

FOREIGN PATENT DOCUMENTS

| | | | |
|---|---|---|---|
| DE | 3621143 A1 | 1/1988 | |
| DE | 39 23 148 A1 * | 1/1991 | .................... 464/180 |
| FR | 1.295.476  * | 5/1962 | .................... 464/180 |
| GB | 835314 A | 5/1960 | |
| JP | S6131925 A | 2/1986 | |

(Continued)

*Primary Examiner* — Greg Binda
(74) *Attorney, Agent, or Firm* — Cantor Colburn LLP (57) ABSTRACT

A torsional vibration absorber for a vehicle is provided. The torsional vibration absorber including a front pilot bearing adapted to couple with a vehicle shaft. A spring member is coupled to the front pilot bearing. An inertia ring having an inner surface is operably coupled to the spring member, wherein the front pilot bearing is centrally disposed along the length of the inertia ring. A rear pilot bearing is adapted to couple with the vehicle shaft, the rear pilot bearing having a portion adjacent the inner surface at one end of the inertia ring.

17 Claims, 6 Drawing Sheets

(56) References Cited

FOREIGN PATENT DOCUMENTS

JP          H01106656 Y2     3/1989
JP          H07301305 A     11/1995

* cited by examiner

FIG. 6

TORSIONAL VIBRATION ABSORBER FOR A VEHICLE

CROSS-REFERENCE TO RELATED APPLICATIONS

The present application is a Nonprovisional Application of U.S. Provisional Application Ser. No. 62/265,574 filed on Dec. 10, 2015, the contents of which are incorporated herein by reference.

FIELD OF THE INVENTION

The subject invention relates to a vehicle having a rear drive module, and more particularly, to a system having a torsional vibration absorber coupled to the interface of the rear drive module and a prop-shaft.

BACKGROUND

Vehicles, such as automobiles and trucks for example, include a rear drive module (RDM) that is connected to the vehicle engine by a prop-shaft. The prop-shaft transmits rotational energy (torque) developed by the vehicle engine to the rear drive module, which in turn transmits the rotational energy to the wheels. In a rear-wheel drive vehicle, the prop-shaft directly couples the RDM to the vehicle's transmission. In an all-wheel or four-wheel drive vehicle, additional components may also be included, such as a power take-off unit for example.

During operation, torsional vibrations generated by the engine may be transmitted along the prop-shaft to the RDM. In some situations, these torsional disturbances may result in undesired noise or increased component wear.

Accordingly, it is desirable to provide a means for damping torsional vibrations in the prop-shaft prior to the RDM.

SUMMARY OF THE INVENTION

In one exemplary embodiment of the invention, a torsional vibration absorber is provided. The torsional vibration absorber comprises a front pilot bearing adapted to couple with a vehicle shaft and a spring member coupled to the front pilot bearing. An inertia ring having an inner surface is operably coupled to the spring member, wherein the front pilot bearing is centrally disposed along the length of the inertia ring. A rear pilot bearing is adapted to couple with the vehicle shaft, the rear pilot bearing having a portion adjacent the inner surface at one end of the inertia ring.

In addition to one or more of the features described herein, or as an alternative, further embodiments of the torsional vibration absorber provide that the rear pilot bearing has a first arm adapted to couple with the shaft. A second arm is provided that is disposed adjacent the inner surface and an intermediate portion is positioned between the first arm and the second arm.

In addition to one or more of the features described herein, or as an alternative, further embodiments of the torsional vibration absorber provide that the rear pilot bearing has a flange extending radially from an end of the second arm. In this embodiment the flange may be arranged adjacent an end of the inertia ring.

In addition to one or more of the features described herein, or as an alternative, further embodiments of the torsional vibration absorber are provided that include a rear spacer bearing disposed between the second arm and the inner surface.

In addition to one or more of the features described herein, or as an alternative, further embodiments of the torsional vibration absorber are provided where the front pilot bearing has a first portion adapted to couple with the shaft. A second portion is provided that extends from the first portion. A flange is further provided that extends from the second portion adjacent to the inner surface.

In addition to one or more of the features described herein, or as an alternative, further embodiments of the torsional vibration absorber is provided that includes a ring coupler member coupled between the inner surface and the spring member.

In addition to one or more of the features described herein, or as an alternative, further embodiments of the torsional vibration absorber is provided that includes a spacer bearing disposed between the ring coupler member, the second portion and the inner surface.

In addition to one or more of the features described herein, or as an alternative, further embodiments of the torsional vibration absorber are provided where the vehicle shaft is a prop-shaft.

In another exemplary embodiment of the invention, a vehicle is provided. The vehicle comprising an engine and a prop-shaft operably coupled to transfer torque from the engine. A differential gear set is operably coupled to the prop-shaft by a pinion shaft and a torsional vibration absorber. The torsional vibration absorber includes a front pilot bearing adapted to couple with the prop-shaft and a spring member coupled to the front pilot bearing. An inertia ring having an inner surface is operably coupled to the spring member, wherein the front pilot bearing is centrally disposed along the length of the inertia ring and a rear pilot bearing adapted to couple with the prop-shaft, the rear pilot bearing having a portion adjacent the inner surface at one end of the inertia ring.

In addition to one or more of the features described herein, or as an alternative, further embodiments of the vehicle are provided where the rear pilot bearing includes a first arm coupled to the prop-shaft. A second arm is provided that is disposed adjacent the inner surface. An intermediate portion is provided that is arranged between the first arm and the second arm.

In addition to one or more of the features described herein, or as an alternative, further embodiments of the vehicle are provided where the rear pilot bearing includes a flange extending radially from an end of the second arm. The flange is adjacent to an end of the inertia ring.

In addition to one or more of the features described herein, or as an alternative, further embodiments of the vehicle are provided that include a rear spacer bearing that is disposed between the second arm and the inner surface.

In addition to one or more of the features described herein, or as an alternative, further embodiments of the vehicle are provided where the front pilot bearing includes a first portion adapted coupled to the prop-shaft. A second portion is provided that extends from the first portion. A flange is provided that extends from the second portion adjacent to the inner surface.

In addition to one or more of the features described herein, or as an alternative, further embodiments of the vehicle are provided that include a ring coupler member that is coupled between the inner surface and the spring member.

In addition to one or more of the features described herein, or as an alternative, further embodiments of the vehicle are provided that include a spacer bearing that is disposed between the ring coupler member, the second portion and the inner surface.

In addition to one or more of the features described herein, or as an alternative, further embodiments of the vehicle are provided where a torsion tube is disposed about the prop-shaft between the engine and a differential housing.

In addition to one or more of the features described herein, or as an alternative, further embodiments of the vehicle are provided where the torsional vibration absorber is at least partially disposed within the torsion tube.

In addition to one or more of the features described herein, or as an alternative, further embodiments of the vehicle are provided where the torsional vibration absorber is at least partially disposed within the differential housing.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features.

Figure 1:
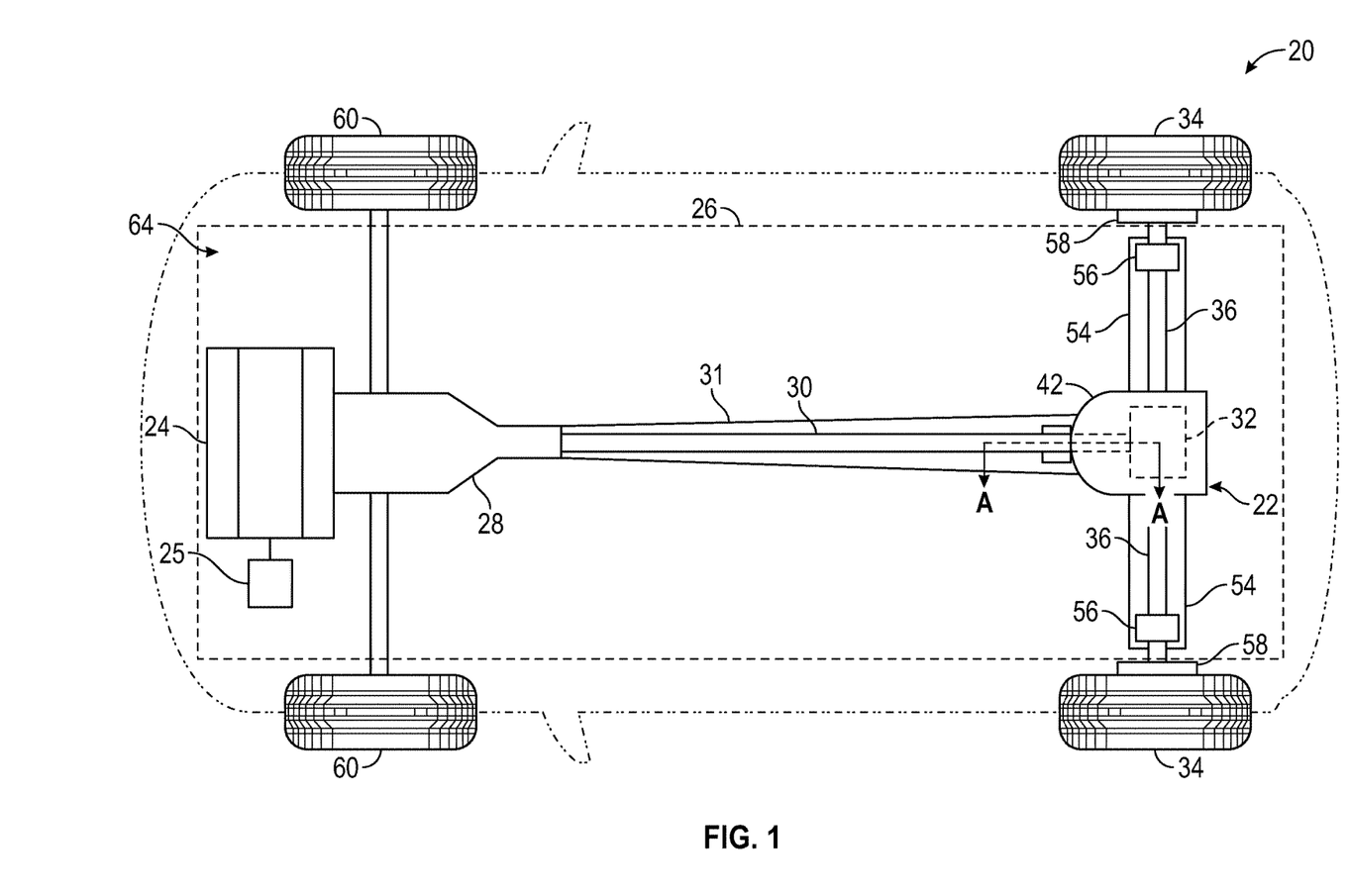
FIG. 1 is a schematic plan view of a vehicle having a rear drive module in accordance with an embodiment.

In accordance with an embodiment, FIG. 1 illustrates a vehicle 20 having a front axle assembly 64 and rear drive module (RDM) 22. It should be appreciated that the vehicle 20 may be an automobile or a truck for example. The vehicle 20 may include an engine 24, such as a gasoline or diesel fueled internal combustion engine. The engine 24 may further be a hybrid type engine that combines an internal combustion engine with an electric motor for example. In one embodiment, the engine 24 includes a controller or engine control module 25 that may selectively deactivate one or more cylinders of the engine 24 during operation to reduce fuel consumption.

The engine 24 and RDM 22 are coupled to a vehicle structure such as a chassis or frame 26. The engine 24 is coupled to the RDM 22 by a transmission, transfer case or coupling 28 and a prop-shaft 30. The transmission 28 may be configured to reduce the rotational velocity and increase the torque of the engine output. This modified output is then transmitted to the RDM 22 via the prop-shaft 30. The RDM 22 transmits the output torque from the prop-shaft 30 to a pair of driven-wheels 34 via axles 36 and wheel flanges 58. In an embodiment, the prop-shaft 30 is disposed within a housing, such as torque tube 31. The torque tube 31 encloses the prop-shaft 30 and extends between a nose portion of a differential housing 42 and the transmission 28.

In one embodiment, the RDM 22 includes the differential housing 42, which supports a hypoid gear set 32. As used herein, the hypoid gear set 32 includes a ring gear, a pinion shaft/gear and a differential case. The differential case may include a differential gear set assembly as is known in the art for transmitting torque from the ring gear to the axles. In one embodiment, a pair of axle tubes 54 is coupled to and extends from the housing 42. One or more wheel bearings 56 may be disposed at an outer end of the axle tubes 54 (i.e. opposite end from the differential housing 42) to support the axles 36. It should be appreciated that in other embodiments, the RDM 22 may have other configurations than a hypoid gear set.

The vehicle 20 further includes a second set of wheels 60 arranged adjacent the engine 24. In one embodiment, the second set of wheels 60 is also configured to receive output from the engine 24. This is sometimes referred to as a four-wheel or an all-wheel drive configuration.

Figure 2:
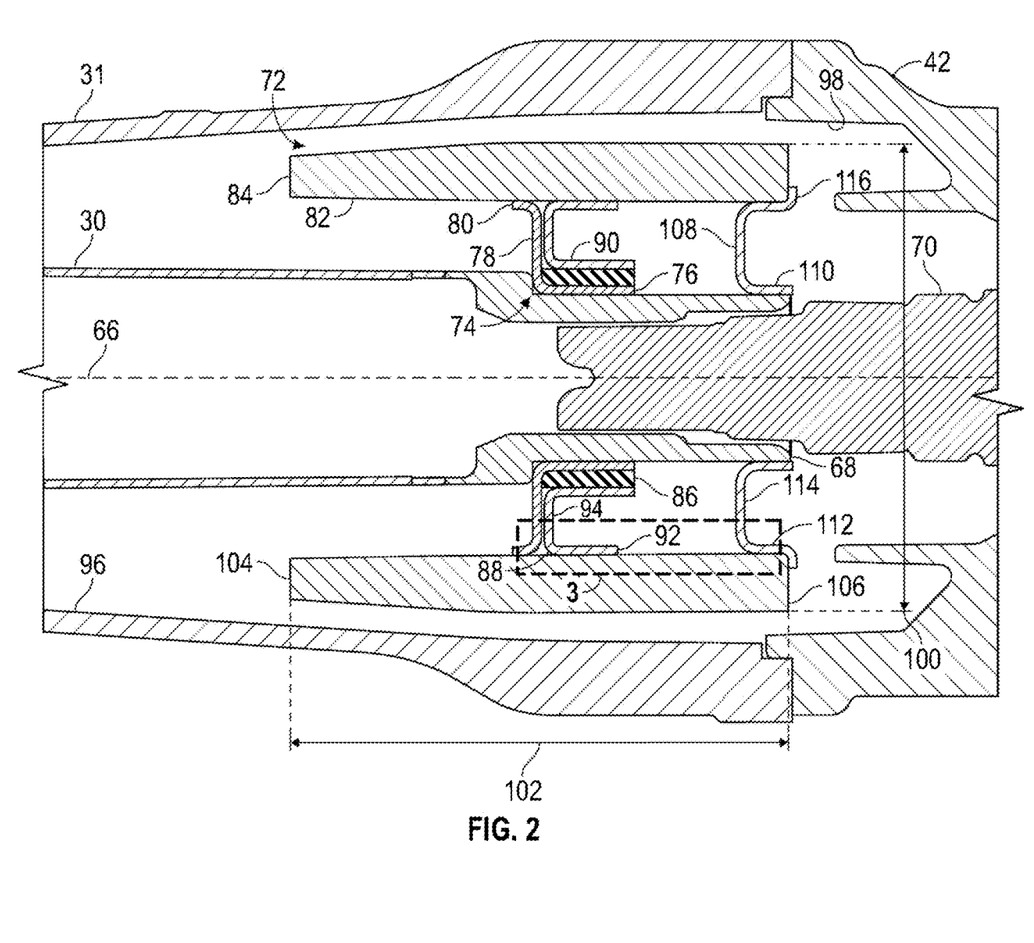
FIG. 2 is a partial sectional view along the section line A-A of FIG. 1 that illustrates the interface between the prop-shaft and the rear drive module in accordance with an embodiment.
Figure 3:
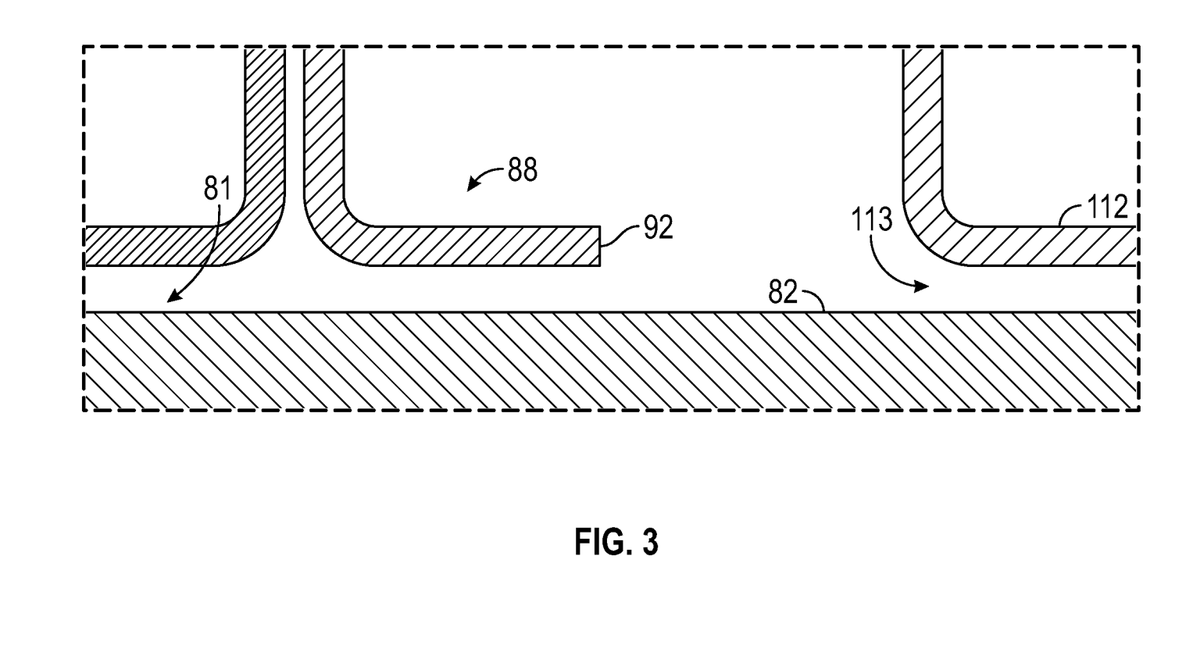
FIG. 3 is an enlarged view of a portion of FIG. 2.
Figure 4:
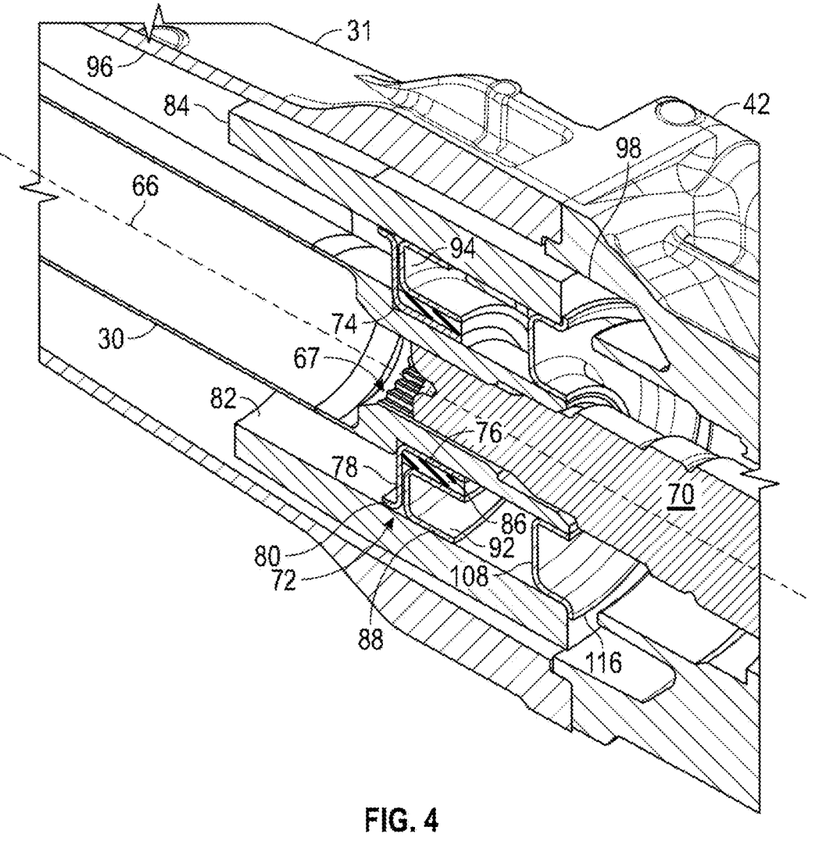
FIG. 4 is a partial perspective view of the interface of FIG. 2.

Referring now to FIGS. 2-4 with continuing reference to FIG. 1, the interface between the prop-shaft 30 and the hypoid gear set 32 will be described. It should be appreciated that while embodiments are described with respect to a rear-wheel drive vehicle, the disclosure should not be so limited. In other embodiments, the RDM 22 may be used in a vehicle configured as an all-wheel or four-wheel drive vehicle.

As used herein, the term "front" refers to a position that is generally closer to the engine 24 or the front of the vehicle 20, while the term "rear" refers to a position that is closer to the rear axle 36 or the rear end of the vehicle 20.

The prop-shaft 30 is defined by the input centerline or axis 66 that is oriented on a plane extending through the center of the prop-shaft 30. The prop-shaft 30 includes an end 68 adapted to couple with a pinion shaft 70 of the hypoid gear set 32. In an embodiment, the prop-shaft 30 is a hollow cylindrical body having an internal (female) spline 67 (FIG. 4) at end 68. The pinion shaft 70 is sized to be received within the hollow body and has a corresponding (male) spline that is adapted to cooperate with the spline of prop-shaft 30. In this manner, the torque is transferred from the prop-shaft 30 to the hypoid gear set 32 and then to the wheels 34 (FIG. 1).

It should be appreciated that torsional vibrations generated in the engine 24, such as due to: combustion not being constant through the combustion cycle, or the motion of the piston mass and connecting rod mass generate alternating torques for example. It is desirable to dampen these torsional vibrations prior to the hypoid gear set 32 to avoid undesired noise and component wear.

In accordance with an embodiment, a torsional vibration absorber 72 (TVA) is provided that is coupled to the prop-shaft 30 adjacent the end 68. The TVA 72 is configured to dampen torsional vibrations that are transmitted from the engine 24 through the prop-shaft 30. In an embodiment, the TVA 72 is configured to dampen to the first torsional natural frequency of the engine 24 crankshaft (not shown). In other embodiments, the TVA 72 is configured to dampen frequencies generated when the engine 24 is operated in alternate modes of operation.

The TVA 72 includes a front pilot bearing 74 that is coupled to the outer diameter of the prop-shaft 30. In an embodiment, the front pilot bearing 74 is press-fit onto the prop-shaft 30. Front pilot bearing 74 may have a generally L-shaped cross-section with a first portion 76 being press-fit onto the prop-shaft 30, and a body 78 extending radially outward from the prop-shaft 30. The body 78 may include an end portion 80 that is curved to extend toward the front of the TVA 72. The end portion 80 (FIG. 4) may arranged to define a gap 81 (FIG. 3) between the outer diameter of the end portion 80 and an inner diameter 82 of an inertia ring 84. It should be appreciated that the gap 81 of FIG. 3 is illustrated in an exaggerated size for clarity and exemplary purposes. In an embodiment, the front pilot bearing 74 is formed from sheet metal, such as by stamping for example and is disposed along the length of the inertia ring 84.

Coupled to the outer diameter of the first portion 76 is a spring member 86, such as an elastomeric or rubber member for example. The spring member 86 is selected to have an elasticity that cooperates with the inertial ring 84 to dampen torsional vibrations. In one embodiment, a coupling ring 88 is coupled between the spring member 86 and the inertial ring 84. In an embodiment, the coupling ring 88 has a generally U-shaped cross-section with a first arm 90 coupled to the spring member 88, a second arm 92 coupled to the inertia ring 84, and an intermediate portion 94 disposed therebetween. The intermediate portion 94 may include an outer surface that engages the body 78. In an embodiment, the engagement of the intermediate portion 94 and body 78 restricts axial movement of the inertia ring 84 in a direction toward the front of the vehicle 20. In an embodiment, a restriction element (not shown) may be formed into one or both of the intermediate portion 94 and body 78 to restrict relative rotational movement between the coupling ring 88 and the front pilot bearing 74.

In one embodiment, the coupling ring 88 is integrally formed with the inertia ring 84, such as by casting for example.

The inertia ring 84 is a generally cylindrical body disposed about the prop-shaft 30 or pinion shaft 70. The inertia ring 84 has a mass configured (sometimes colloquially referred to as "tuned") to the vibration frequency where damping is desired. It should be appreciated that it is desired to have the center of mass of the inertia ring 86 spaced apart from the axis 66. The more distance between the axis 66 and the center of mass, the more efficient (in terms of size) the TVA 72 may perform. However, due to space restrictions, such as by the inner surface 96 of the torque tube 31 or the inner surface 98 of the differential housing 42, the outer diameter 100 of the inertia ring 84 may be constrained by the surrounding structures. As a result, to achieve the desired mass to provide damping, the length 102 of the inertia ring 84 may be increased. For example in one embodiment, to achieve the same inertia, as the mass of the inertia ring 84 is brought closer to the axis 66, the length of the inertia ring increases by a factor of 1.86 and the mass by a factor of 2.63.

However, as the length 102 of the inertia ring 84 is increased, there is an increased risk that the ends 104, 106 of the inertia ring 84 may contact the inner surfaces 96, 98. This contact may be caused by the pivoting or twisting movement of the inertia ring 84 about the spring member 76 due to translational vibrations or impact loading caused by operation of the vehicle 20. In other words, a longer and heavier inertia ring has a larger moment in a direction perpendicular to the axis 66.

By way of comparison, two embodiments of the inertia ring 84 are included below:

TABLE 1

| Scenario | Embodiment 1 | Embodiment 2 |
|---|---|---|
| OD (m) | 0.165 | 0.11 |
| ID (m) | 0.155 | 0.087 |
| Mass Center (Diameter)(m) | 0.16 | 0.0985 |
| Mass Center (Radius)(m) | 0.08 | 0.04925 |
| Length (m) | 0.063 | 0.117 |
| Volume (m^3) | 0.00015834 | 0.00041636 |
| Density (kg/m^3) | 7,900 | 7,900 |
| Mass (kg) | 1.251 | 3.289 |
| Moment of Inertia about axis (kgm^2) | 0.0080 | 0.0080 |
| Moment perpendicular to axis (kgm^2) | 0.0044 | 0.0077 |

As can be seen from Table 1, Embodiment 2 has a smaller outer diameter and a longer length than Embodiment 1. Further, the moment of inertia about the axis 66 is the same between the two embodiments. However, the moment of inertia in a direction perpendicular to the axis 66 is almost 43% greater in Embodiment 2 when compared with Embodiment 1 due to the increased mass caused by the longer length. It should be appreciated that this larger moment of inertia increases the risk of the inertia ring 84 contacting the surrounding surfaces.

To resolve this, and reduce the risk of the inertia ring 84 contacting the torque tube 31 or the differential housing 42, embodiments may include a rear pilot bearing 108. The rear pilot bearing 108 provides advantages in restricting the axial movement and the pivoting or twisting movement of the inertia ring 84.

In an embodiment, the rear pilot bearing 108 includes a generally U-shaped body having a first arm 110, a second arm 112 and an intermediate member 114. The first arm 110 is coupled to the outer diameter of the prop-shaft 30, such as by a press-fit for example. In an embodiment, the outer diameter of the second arm 112 may be spaced apart (gap 113, FIG. 3) from the inside diameter 82 of the inertia ring 84. It should be appreciated that the outer diameter of the second arm 112 restricts the movement of the end 106. As a result, by arranging the gap 113 between the outer diameter of second arm 112 to be smaller than the distance between the inertia ring 84 and the surfaces 96, 98, contact between the TVA 72 and the torque tube 31 or differential housing 42 may be avoided.

In one embodiment, the rear pilot bearing 108 may further include a flange 116. The flange 116 extends radially from an end of the second arm 112 and has a surface adjacent to or in contact with the end 106. It should be appreciated that the flange 116 restricts axial movement by the inertia ring 84 in the rearward direction. Thus, the axial movement of the inertia ring 84 is restricted both towards the front and rear of the vehicle and pivoting movement about an axis perpendicular to the axis 66.

Figure 5:
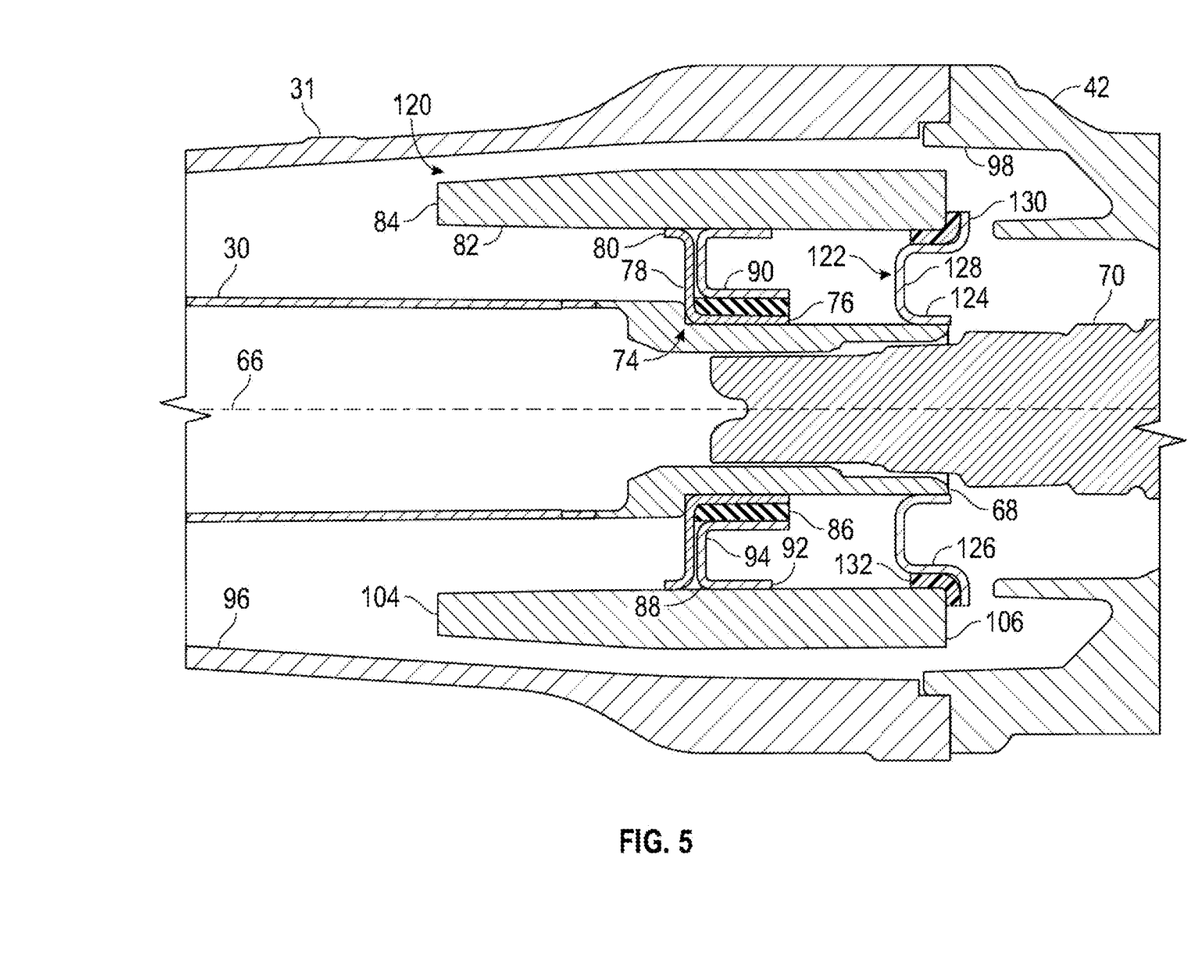
FIG. 5 is a partial sectional view along the section line A-A of FIG. 1 of the interface between the prop-shaft and the rear drive module in accordance with another embodiment.

Referring now to FIG. 5, another embodiment is shown of the torsional vibration absorber (TVA) 120. In this embodiment, the front pilot bearing 74, spring member 86 and coupling ring 88 are configured in the same manner as described herein with respect to FIGS. 1-4 and for brevity will not be further described here. In this embodiment, the rear pilot bearing 122 has a generally U-shaped cross-section with a first arm 124, a second arm 126 and an intermediate portion 128. The first arm 124 is coupled to the prop-shaft 30, such as by a press-fit for example. A flange 130 extends from the end of the second arm 126. The second arm 126 and the flange 130 are spaced apart from inner surface 82 of the inertia ring 84 by a gap. Within this is gap, a spacer bearing 132 is disposed between the inertia ring 84 and the rear pilot bearing 122.

In an embodiment, the spacer bearing 132 is made from a plastic material, such as nylon for example. The spacer bearing 132 may be coupled to the second arm 126 and in contact with the surface of inner diameter 82 of the inertia ring 84. The spacer bearing 132 has a generally L-shaped cross-section with one portion disposed between the end 106 and the flange 130. In some embodiments, the spacer bearing 132 provides advantages in providing restriction of axial motion and pivoting movement as described here, while also reducing noise generated by the TVA 120.

Figure 6:
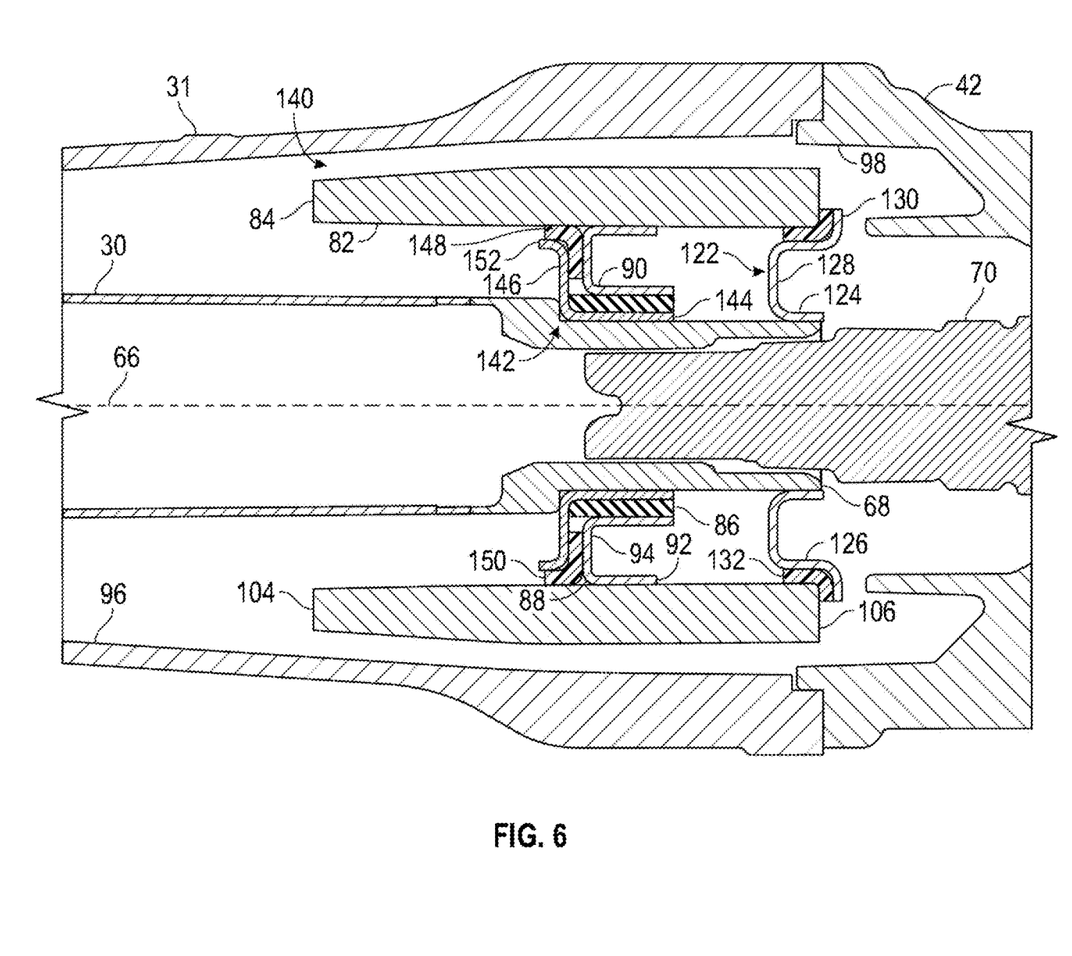
FIG. 6 is a partial sectional view along the section line A-A of FIG. 1 of the interface between the prop-shaft and the rear drive module in accordance with another embodiment.

Referring now to FIG. 6, another embodiment is shown of the torsional vibration absorber (TVA) 140. In this embodiment, the rear pilot bearing 122 and spacer bearing 132 are configured in the same manner as described herein with respect to FIG. 5 and for brevity will not be further described here. In this embodiment, the front pilot bearing 142 includes an elongated first portion 144 that is sized to define a gap between the intermediate portion 94 of the coupling ring 88 and the body 146. A front spacer bearing 148 is disposed within the gap between the front pilot bearing 142 and the coupling ring 88. The front spacer bearing 148 has a generally L-shaped cross-section with a portion 150 disposed between a flange 152 on the front pilot bearing 142 and the surface of inner diameter 82 of the inertia ring 84. The front pilot bearing is centrally disposed along the length of the inertia ring.

In an embodiment, the front spacer bearing 148 is made from a plastic material, such as nylon for example. The front spacer bearing 148 may be coupled to the second arm 94 and in contact with the surface of inner diameter 82 of the inertia ring 84. In some embodiments, the front spacer bearing 148 provides advantages in providing restriction of axial motion and pivoting movement as described here, while also reducing noise generated by the TVA 120.

It should be appreciated that while embodiments herein describe the TVA as being disposed about the prop-shaft 30, this is for exemplary purposes and the claimed invention should not be so limited. In other embodiments, the TVA may be disposed about the pinion shaft or partially disposed about two shafts for example.

Some embodiments described herein provide advantages in damping torsional vibrations in a rotating shaft and keeping the TVA from contacting surrounding structures during operation. Some embodiments described herein provide advantages in using a TVA in a confined space without contacting the surrounding structures during operation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A torsional vibration absorber comprising:
a front pilot bearing adapted to directly couple with a vehicle shaft;
a spring member coupled to the front pilot bearing;
an inertia ring having an inner surface operably coupled to the spring member, wherein the front pilot bearing is centrally disposed along a length of the inertia ring; and
a rear pilot bearing adapted to couple with the vehicle shaft, the rear pilot bearing having a portion adjacent the inner surface at one end of the inertia ring.

2. The torsional vibration absorber of claim 1 wherein the rear pilot bearing includes a first arm adapted to couple with the vehicle shaft, a second arm disposed adjacent the inner surface, and an intermediate portion between the first arm and the second arm.

3. The torsional vibration absorber of claim 2 wherein the rear pilot bearing further includes a flange extending radially from an end of the second arm, the flange being adjacent an end of the inertia ring.

4. The torsional vibration absorber of claim 3 further comprising a rear spacer bearing disposed between the second arm and the inner surface.

5. The torsional vibration absorber of claim 1 wherein the front pilot bearing includes a first portion adapted to couple with the vehicle shaft, a second portion extending from the first portion, and a flange extending from the second portion adjacent the inner surface.

6. The torsional vibration absorber of claim 1 wherein the vehicle shaft is a prop-shaft.

7. A torsional vibration absorber comprising:
a front pilot bearing adapted to couple with a vehicle shaft, the front pilot bearing includes a first portion adapted to couple with the vehicle shaft, a second portion extending from the first portion, and a flange extending from the second portion adjacent the inner surface;
a spring member coupled to the front pilot bearing;
an inertia ring having an inner surface operably coupled to the spring member, wherein the front pilot bearing is centrally disposed along a length of the inertia ring;
a rear pilot bearing adapted to couple with the vehicle shaft, the rear pilot bearing having a portion adjacent the inner surface at one end of the inertia ring; and
a coupling ring coupled between the inner surface and the spring member.

8. The torsional vibration absorber of claim 7 further comprising a spacer bearing disposed between the coupling ring, the second portion and the inner surface.

9. A vehicle comprising:
an engine;
a prop-shaft operably coupled to transfer torque from the engine;
a differential gear set operably coupled to the prop-shaft by a pinion shaft; and
a torsional vibration absorber comprising:
a front pilot bearing adapted to directly couple with the prop-shaft;
a spring member coupled to the front pilot bearing;
an inertia ring having an inner surface operably coupled to the spring member, wherein the front pilot bearing is disposed along a length of the inertia ring;
a coupling ring coupled between the inner surface and the spring member; and
a rear pilot bearing adapted to couple with the prop-shaft, the rear pilot bearing having a portion adjacent the inner surface at one end of the inertia ring.

10. The vehicle of claim 9 wherein the rear pilot bearing includes a first arm coupled to the prop-shaft, a second arm disposed adjacent the inner surface, and an intermediate portion between the first arm and the second arm.

11. The vehicle of claim 10 wherein the rear pilot bearing further includes a flange extending radially from an end of the second arm, the flange being adjacent an end of the inertia ring.

12. The vehicle of claim 11 further comprising a rear spacer bearing disposed between the second arm and the inner surface.

13. The vehicle of claim 9 wherein the front pilot bearing includes a first portion adapted coupled to the prop-shaft, a second portion extending from the first portion, and a flange extending from the second portion adjacent the inner surface.

14. The vehicle of claim 9 further comprising a spacer bearing disposed between the coupling ring, the second portion and the inner surface.

15. The vehicle of claim 9 further comprising a torque tube disposed about the prop-shaft between the engine and a differential housing.

16. The vehicle of claim 15 wherein the torsional vibration absorber is at least partially disposed within the torque tube.

17. The vehicle of claim 15 wherein the torsional vibration absorber is at least partially disposed within the differential housing.

* * * * *